Patented Oct. 17, 1944

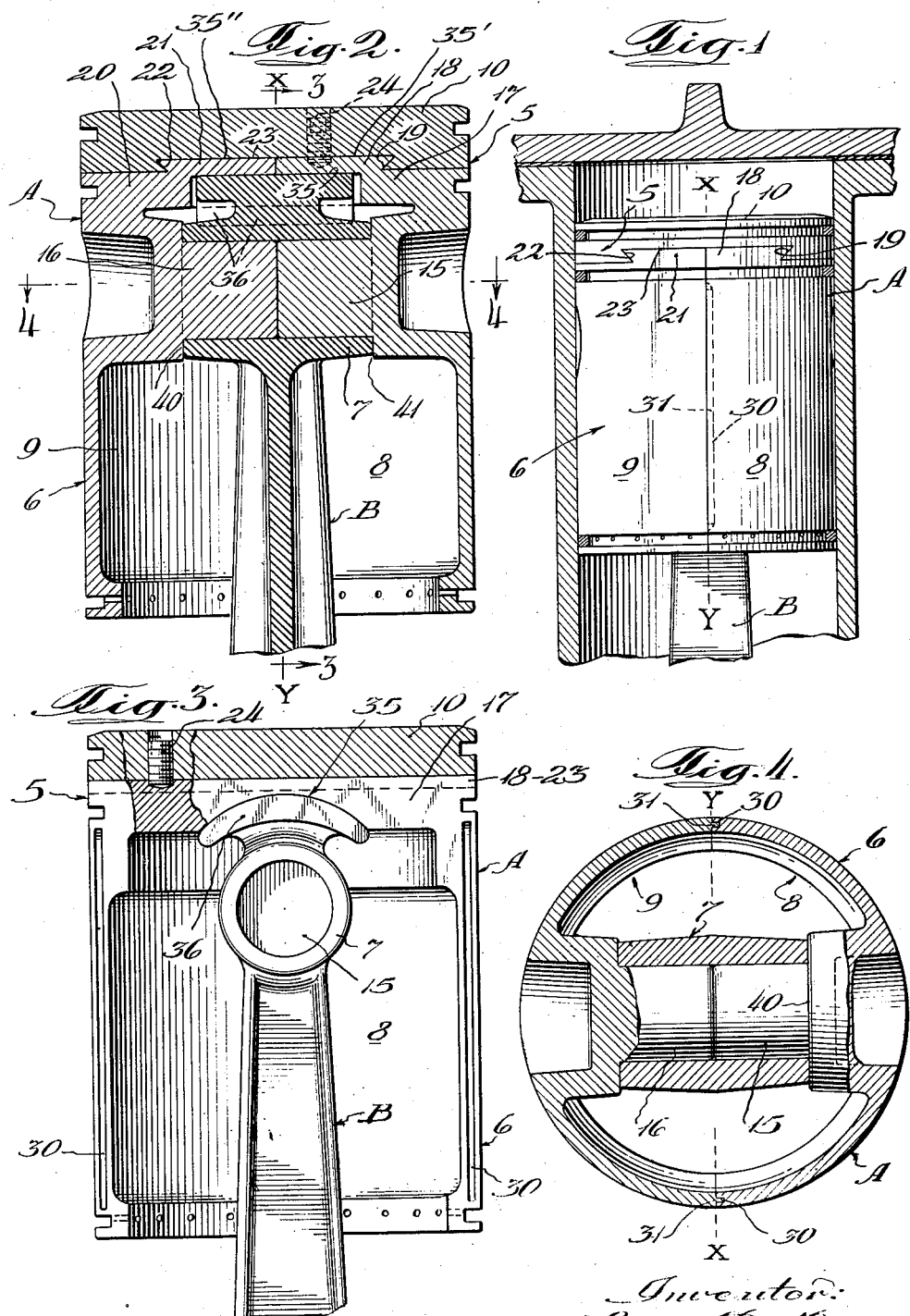
Oct. 17, 1944.     L. B. BERG     2,360,642
PISTON AND CONNECTING-ROD ASSEMBLY
Filed April 15, 1943     2 Sheets-Sheet 1
Inventor:
Louis B. Berg
By Williams, Bradbury & Hinkle
Attorneys Oct. 17, 1944.    L. B. BERG    2,360,642
PISTON AND CONNECTING-ROD ASSEMBLY
Filed April 15, 1943    2 Sheets-Sheet 2
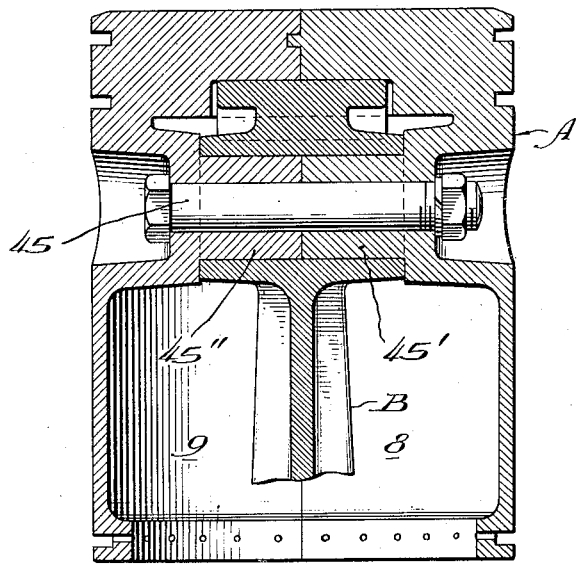
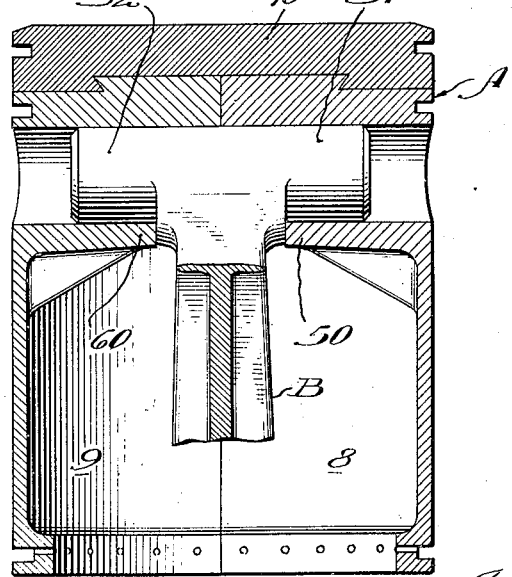
Inventor:
Louis B. Berg
By Williams, Bradbury & Hinkle
Attorneys.

2,360,642

UNITED STATES PATENT OFFICE 2,360,642

PISTON AND CONNECTING-ROD ASSEMBLY

Louis B. Berg, Chicago, Ill., assignor to Verson Allsteel Press Company, Chicago, Ill., a corporation of Delaware Application April 15, 1943, Serial No. 483,088

6 Claims. (Cl. 309—14)

My invention relates to piston and connecting-rod assemblies.

Primarily it has to do with the production and union of a piston and a connecting-rod particularly adapted for use in internal combustion engines, although the assembly may, by appropriate design, be utilized in reciprocating pumps, compressors and steam engines.

The principal object of my invention is to facilitate and cheapen the manufacture of piston-connecting-rod assemblies without detracting from, but on the contrary increasing, their efficiency and effectiveness of operation.

Other objects and advantages will hereinafter appear.

The invention will be illustrated and explained as embodied in piston-connecting-rod assemblies which may be considered typical for gasoline engines.

In the drawings,

Fig. 1 is a longitudinal cross section of an engine cylinder with the piston and connecting-rod assembly shown in elevation and the piston rings in section;

Fig. 2 is a slightly enlarged central longitudinal section of only the piston and connecting-rod assembly;

Fig. 3 is a section at right angles to that of Fig. 2, i. e., on the line 3—3 of Fig. 2;

Fig. 4 is a section on the line 4—4 of Fig. 2;

Fig. 5 is a longitudinal section showing a different arrangement for retaining the piston and connecting-rod assembly together; and Fig. 6 is a longitudinal section of a modified construction for the connection between the piston and the connecting-rod.

In general the preferred construction of my piston and connecting-rod assembly includes a piston of the common skirted variety, which is formed of two complementary halves, each half including a part of the connecting-rod trunnion, and a connecting-rod which, in addition to the usual cylindrical upper bearing, has a convexly arcuate anvil which cooperates with a complementary concavely arcuate saddle in the piston head to communicate the thrust between the piston and the connecting-rod.

Referring now to the drawings, the assembly includes, in general, a piston A and a connecting-rod B. The piston has a head 5, from which depends a cylindrical skirt 6, such as is common in automotive engine pistons. The head and skirt may be provided with appropriate annular piston-ring and oil grooves as indicated. Between its trunnion bearing 7 and the crank-pin bearing (not shown) the connecting-rod may be of conventional design.

In the preferred construction, which is illustrated in Figs. 1 to 4, the inner part of the head, including the connecting rod trunnion, and the skirt of the complete piston are formed of complementary sections, preferably of half-sections 8 and 9 which are brought together in abutting relation along a longitudinal plane X—Y at right angles to the connecting-rod axis of rotation. These complementary confronting half-sections are held together by a circular cap 10 which forms the extreme outer end of the piston head. Thus half-section 8 includes a trunnion stud 15 and half-section 9 includes a trunnion stud 16 which align and abut to provide a complete trunnion when the half-sections are brought together, as is shown clearly in Figs. 2 and 4. The outer surface of the head portion 17 of half-section 8 is formed with a cross rib 18, the outer lateral edge of which is under-cut as shown at 19. Likewise the outer surface of head portion 20 of half-section 9 is formed with a cross rib 21, the outer lateral edge of which is under-cut as shown at 22. When, therefore, the two half-sections of a piston are brought together, the ribs 21 and 22 complement each other to form the tenon of a dovetail joint with the head-cap 10. The mortise 23 of this joint is formed by an under-cut groove extending diametrically across the inner surface of head-cap 10. A set screw 24 threaded through head-cap 10 and against (or into a hole in) head portion 17 will serve to lock the parts together by preventing the tenon from sliding in its mortise. Proper abutting alignment and subsequent retention in relative position of the skirt portions of the two piston half-sections may be facilitated by providing the edges of the side wall of one half-section—for example section 8—with longitudinal grooves 30 and the edges of the side wall of the other half-section with complementary longitudinal tongues 31—the grooves and tongues being adapted snugly to interfit to form a mortise joint throughout the greater part of the length of the piston. Except that the half-sections must be respectively provided with grooves and with tongues, the two are identical.

The inner side of the head of the piston is formed with an arcuate saddle 35 consisting of the two complementary parts 35' and 35'' formed in half-sections 8 and 9, respectively. This saddle is located between the connecting-rod trunnion axis and the outer surface of the piston head. Its curvature should be concentric to the axis of rotation of the connecting rod trunnion 15—16. This saddle 35 serves as a bearing and thrust seat for an arcuately surfaced anvil 36 formed on the upper end of the connecting-rod symmetrically to the longitudinal axis thereof. The curvature of the bearing surface of anvil 36 should, of course, also be concentric with the axis of the trunnion. In operation within an engine cylinder, this arcuate saddle in the piston head and the arcuate anvil on the trunnion end of the connecting-rod receive and transmit most if not all, of the thrust between the piston and the connecting-rod, both on compression and power strokes. On the other hand, the trunnion of the piston and the trunnion bearing of the connecting-rod are relieved of heavy thrust, being subjected to pressure or stress largely, if not entirely, only on the intake strokes or during the starting of internal combustion engines.

In uniting the two piston half-sections and connecting-rod to form a piston-connecting-rod assembly, the two piston half-sections are brought together laterally with the trunnion studs 15 and 16 inserted into opposite ends of the bore of the trunnion bearing of the connecting rod. The tongues 31 are inserted into the grooves 30 along the confronting edges of the piston half-sections and the two half-sections and connecting rod are pushed together laterally until the confronting surfaces of the two half-sections abut. When this condition is obtained, the head-cap 10 is slipped laterally into position with its mortise fitting the tenon in the top surface of the piston half-sections. Then turning in the set screw 24 will securely anchor the parts together with the connecting rod anvil 36 bearing against the piston saddle 35 and with the shoulders 40 and 41, formed as a part of the trunnion studs 15 and 16, respectively, abutting the ends of the connecting-rod trunnion bearing 7 and thereby preventing axial play of the connecting-rod within the piston.

In the modified arrangement shown in Fig. 5, the half-sections 8 and 9 are held together by a bolt 45 extending through holes which are formed in the two trunnion studs 45' and 45''. When so assembled, the piston cap and dovetailed interlock between a cap and the piston half-sections may be eliminated. Proper register longitudinally and retention of the half-sections in the necessary complementary relationship may be facilitated by providing the head portions with a diametrically positioned interfitting tongue and groove 46–47.

In the modification shown in Fig. 6, the trunnion arrangement between the piston and the connecting-rod are reversed. That is, the two half-section trunnion studs 50 and 60 are formed female so as to provide axially aligned sockets for receiving the opposite ends 51 and 52 of the trunnion which, in this instance, is formed as part of the connecting-rod. In such an arrangement the trunnion socket acts, in effect, as the thrust communicating saddle and the piston trunnion serves also as the anvil heretofore described. The assembly may be retained together by a piston cap 10 and a dovetail interlock between that cap and the piston half-sections as shown and explained in connection with Figs. 1 to 4.

The materials used in the construction of the pistons and of the connecting-rods may be such as lend themselves readily to the desired method of production and the service required, such, for example, as appropriate aluminum alloys for automobile and airplane engines. Of course, it is to be understood that, if desired or required for any particular service, bushings of approved construction and composition may be used to line the piston and connecting-rod bearing surfaces. However, by employing appropriate metals for pistons and for the connecting-rods and lapping or burnishing the complementary bearing surfaces, conventional bushing may frequently be dispensed with.

The construction of the piston in two complementary parts or half-sections readily lends itself to simple-accurate and inexpensive methods of production, such as die-casting, extrusion, coining, etc., depending upon the character of the metal employed, the quantity desired and available, manufacturing facilities, etc. Proper assembly of the pistons with connecting-rods is also facilitated. A full floating assembly is provided with elimination or lessening of many present hazards and objections, such as piston or wrist pin fitting, machining and cooling stresses, friction and side thrust between piston and cylinder side walls, piston slap and wrist pin knock. It will be apparent that, since the principal heavy thrusts occur between surfaces of the piston and connecting-rod which are closer to the point where power is applied or exerted—viz., the outer face of the piston head—than in present day conventional designs, the tendency for rocking action, lateral thrust against the cylinder wall and incident wear are less than with current assemblies. As a matter of fact, in the assembly herein illustrated and described the piston functions in a measure more like a reciprocating valve than as a lateral-thrust-resisting guide against the cylinder wall.

Having set forth the salient features of my invention and illustrated and described a preferred embodiment and several modifications thereof, what I claim and desire to secure by United States Letters Patent is as follows:

1. A piston and connecting-rod assembly comprising a piston formed of two complementary axially confronting sections, each section including a connecting-rod trunnion stud and an arcuate saddle concentric with the trunnion axis and located between that axis and the closed end of the piston, a connecting-rod having a bearing for fitting about the trunnion studs of the piston and an arcuate anvil fitting against the saddle formed in the piston, and means for retaining the piston sections together.

2. A piston and connecting-rod assembly comprising a piston formed of two complementary axially confronting sections, each section having a connecting-rod trunnion stud and an arcuate saddle concentric with the trunnion axis, a connecting-rod having a bearing for fitting about the trunnion studs of the piston and an arcuate anvil fitting against the saddle formed in the piston, and a cap fitting against the end of the piston-sections and united thereto by a dovetail joint.

3. A piston and connecting-rod assembly comprising a piston formed of complementary longitudinally abutting sections which fit together to complete the piston, at least one of the sections having an arcuate bearing-saddle, a connecting-rod having an arcuate bearing-anvil insertable laterally into contact with the bearing-saddle of the piston and retained in such contact by one of the piston sections, and means for preventing separation of the fitted together piston sections whereby the assembly is held together.

4. A piston and connecting-rod assembly comprising a piston formed of complementary longitudinally abutting sections which when fitted together in abutting relation constitute a complete piston, two of said sections being formed with trunnion studs which when the piston sections are fitted together constitute a connecting-rod trunnion and at least one of said sections being formed with an arcuate-bearing-saddle the surface of which is concentric with the axis of the connecting-rod trunnion and lies between such axis and the head of the piston, a connecting-rod having a bearing for fitting about the trunnion studs of the piston and an arcuate anvil fitting the saddle of the piston, and means for holding the piston sections and the connecting-rod together as an assembly.

5. A piston and connecting-rod assembly comprising a piston formed of complementary longitudinally abutting sections at least two of which are formed with trunnion studs and an arcuate bearing-saddle surface, such sections when fitted together constituting the head and skirt of a complete piston with a connecting-rod trunnion and a thrust resisting saddle bearing located between the trunnion axis and the piston head, a connecting-rod having a bearing for fitting about the piston trunnion and an arcuate anvil for fitting the piston saddle bearing, and means for retaining the piston sections and the connecting-rod together as a complete assembly.

6. A piston and connecting-rod assembly comprising a piston formed of complementary longitudinally abutting sections at least two of which are formed with trunnion studs and an arcuate bearing-saddle surface, such sections when fitted together constituting the head and skirt of a complete piston with a connecting-rod trunnion and a thrust resisting saddle bearing located between the trunnion axis and the piston head, a connecting-rod having a bearing for fitting about the piston trunnion and an arcuate anvil for fitting the piston saddle bearing, and a bolt passing through aligned holes in the trunnion studs of the piston to clamp the piston half-sections and connecting-rod together as a complete assembly.

LOUIS B. BERG.